United States Patent [19]

Koizumi et al.

[11] 4,430,296

[45] Feb. 7, 1984

[54] MOLYBDENUM-BASED ALLOY

[75] Inventors: Hideo Koizumi, Tokyo; Hideo Ishihara; Tatsuhiko Matsumoto, both of Yokohama; Katsuhiko Kawakita, Yokosuka, all of Japan

[73] Assignee: Tokyo Shibaura Denki Kabushiki Kaisha, Kawasaki, Japan

[21] Appl. No.: 391,685

[22] Filed: Jun. 24, 1982

[30] Foreign Application Priority Data

Jun. 25, 1981 [JP] Japan ................................. 56-97526

[51] Int. Cl.³ .................................................. C22C 27/04
[52] U.S. Cl. ............................... 420/429; 148/11.5 F; 148/423
[58] Field of Search ..................... 420/429; 428/663; 148/423, 11.5 F

[56] References Cited

U.S. PATENT DOCUMENTS 3,150,446  9/1964  Todd ..................................... 420/429
3,177,076  4/1965  Timmons et al. .................... 420/429
4,370,299  1/1983  Morozumi ............................ 420/429

Primary Examiner—L. Dewayne Rutledge
Assistant Examiner—R. McDowell

[57] ABSTRACT

A molybdenum-based alloy improved in mechanical strength and hot workability, which consists of 0.01 to 5.0% by weight of vanadium, 10 to 100 ppm of boron, 10 to 1,000 ppm of carbon, and the balance of molybdenum.

3 Claims, 4 Drawing Figures

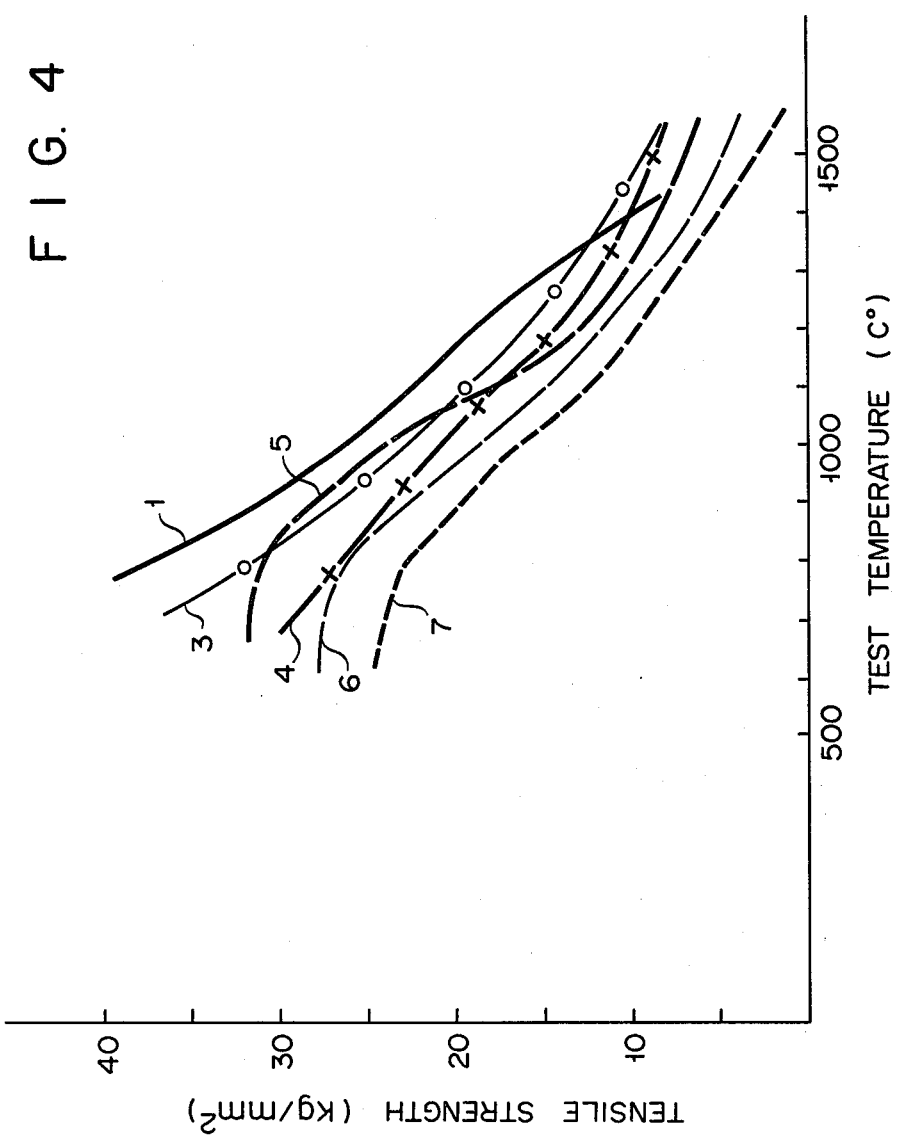

MOLYBDENUM-BASED ALLOY

BACKGROUND OF THE INVENTION

The present invention relates to a molybdenum-based alloy which is improved in mechanical strength, hot workability and so on.

Molybdenum-based alloys have excellent stability at high temperatures in vacuums or in inert or reducing atmospheres, and are currently used as adiabatic materials. The field of application of molybdenum-based alloys is recently spreading to nuclear-related fields. However, with conventional molybdenum-based alloys, when they are heated to the recrystallization temperature, the grain become coarse, and when they are cooled to ambient temperature, they show poor ductility and brittle fracture occurs at the grain boundaries. Conventional molybdenum-based alloys further have the drawbacks of poor hot workability and significant embrittlement upon irradiation with neutrons. In order to solve these problems, it has been proposed to prepare a molybdenum-based alloy containing a small amount of vanadium (Japanese Patent Publication No. 33,084/1978). According to this alloy, vanadium is present in the form of a solid solution to increase the mechanical strength of the alloy and to clean the grain boundaries by reaction of vanadium with the grain boundary impurities. It is also proposed to prepare a molybdenum-based alloy containing carbon to improve the deoxidation effect (Japanese Patent Disclosure No. 47,511/1976).

Although the addition of vanadium or carbon as proposed above solves the problems to a certain extent, satisfactory results have not been obtained so far and further improvements in molybdenum-based alloys have been desired.

SUMMARY OF THE INVENTION

It is an object of the present invention to provide a molybdenum-based alloy which eliminates the problems as described above and which is improved in hot workability and mechanical strength by achieving microstructures after recrystallization and cleaner grain boundaries.

In order to achieve this object, there is provided according to the present invention a molybdenum-based alloy consisting of 0.01 to 5.0% by weight of vanadium, 10 to 100 ppm of boron, 10 to 1,000 ppm of carbon and the balance of molybdenum.

BRIEF DESCRIPTION OF THE DRAWINGS

FIG. 4 is a graph showing the tensile strength of the molybdenum-based alloys at high temperatures.

DETAILED DESCRIPTION OF THE PREFERRED EMBODIMENT

Figure 1:
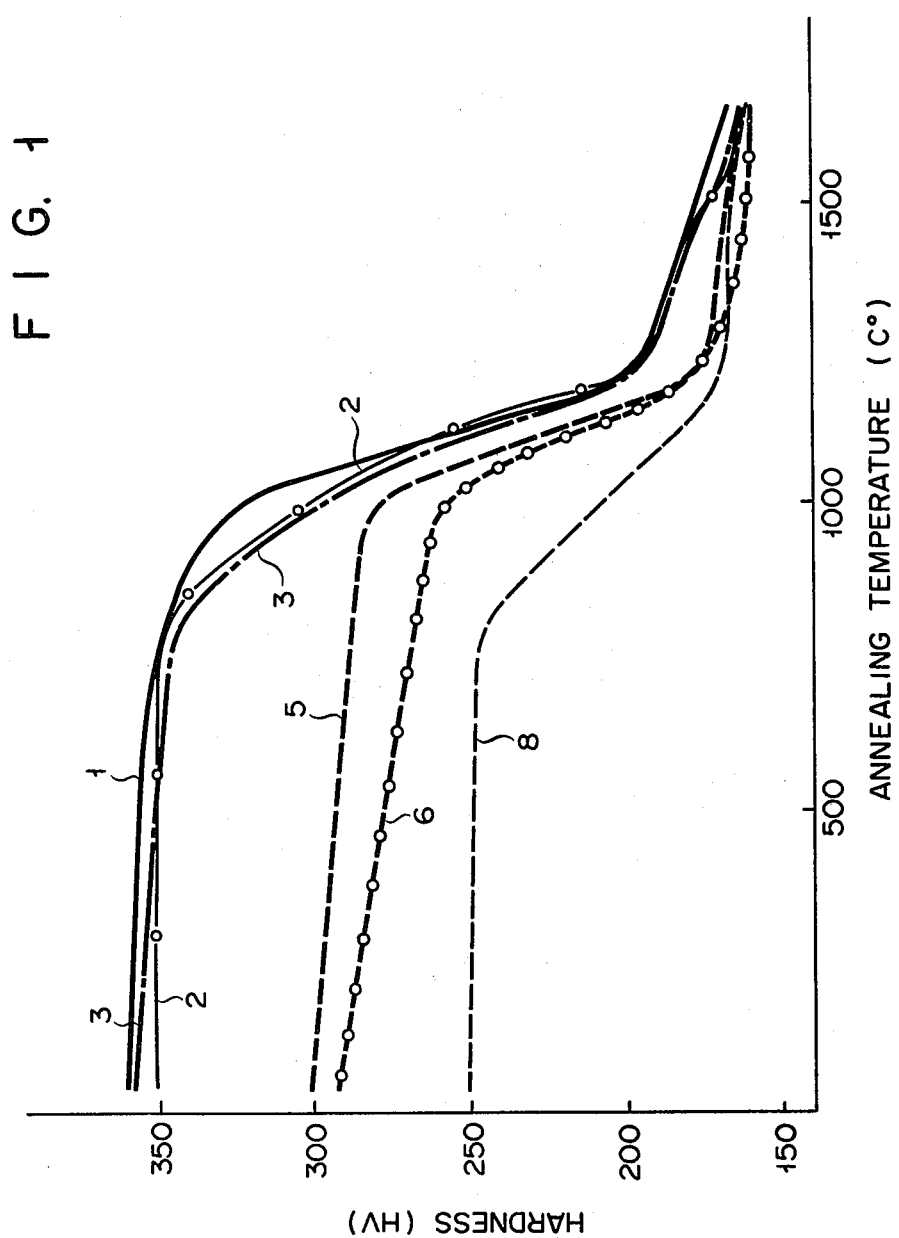
FIGS. 1 and 2 are graphs showing the hardness of molybdenum-based alloys after annealing.

In a molybdenum-based alloy of the present invention, vanadium serves to form a solid solution with molybdenum to increase the mechanical strength of the alloy and to clean the grain boundaries. These effects of vanadium may not be obtained if vanadium is used in an amount less than 0.01% by weight. On the other hand, hot workability is impaired if the amount of vanadium exceeds 5.0% by weight. Therefore, vanadium is more preferably contained in the alloy in the amount of 0.1 to 2.5% by weight. Boron largely contributes to clean the grain boundaries as well as to prevent formation of coarse grain during recrystallization by synergism with carbon. When the amount of boron is less than 10 ppm, the cleaning effects are insufficient. On the other hand, if the amount of boron exceeds 100 ppm, crystals of $MO_2B$ become coarse and become brittle. Boron is preferably contained in the alloy in the amount of 20 to 80 ppm. Carbon provides the deoxidation effect; it reacts with oxygen upon melting thereby removing free oxygen to facilitate the effects obtainable with boron. When carbon is contained in the amount exceeding 1,000 ppm, the workability of the alloy becomes extremely poor. In practice, the amount of carbon is preferably less than 500 ppm.

EXAMPLE

Molybdenum, boron, vanadium and a carbon powder were mixed in a predetermined ratio. The resultant mixture was formed at a static pressure of 2,000 kg/cm$^2$ and when then sintered at 1,850° C. Such sintered bodies were arc-melted in vacuum to prepare molybdenum-based alloys (55 mm diameter) of various compositions as shown in Table 1 below:

TABLE 1

| Sample No. | V% | B(ppm) | C(ppm) | Mo |
|---|---|---|---|---|
| 1 | 1.08 | 39 | 322 | Balance |
| 2 | 0.55 | 79 | 448 | Balance |
| 3 | 0.57 | 54 | 429 | Balance |
| 4 | 0.15 | 69 | 387 | Balance |
| 5 | 0.98 | — | 390 | Balance |
| 6 | 0.58 | — | 200 | Balance |
| 7 | 0.12 | — | 290 | Balance |
| 8 | — | — | — | Pure Mo |

Table 1 above shows the compositions of the molybdenum-based alloys manufactured by the process as described above; sample Nos. 1 to 4 correspond to the present invention while sample Nos. 5 to 8 correspond to prior art for the purpose of comparison. Sample No. 8 was obtained by powder metallurgy. These samples were then heated to a temperature of 1,200° C. and were subjected to hot forging four to five times to provide plates of 6 mm thickness. Table 2 below shows formation conditions of cracks in these plates:

TABLE 2

| Sample No. | Number of Samples which Formed Cracks at End Faces/ Number of Samples being Forged |
|---|---|
| 1 | 0/6 |
| 2 | 0/6 |
| 3 | 0/6 |
| 4 | 0/6 |
| 5 | 2/6 |
| 6 | 1/6 |
| 7 | 1/6 |

It is seen from Table 2 above, that the molybdenum-based alloys of the present invention are significantly improved in hot workability as compared to those of prior art.

For the purpose of comparison, another sample was prepared by adding 0.03 to 0.3% by weight of zirconium to the composition of sample No. 1. This sample was treated in the same manner and hot-forged. The sample was subject to cracks and could not be processed into a plate of prescribed thickness without developing the formation of cracks.

Plates obtained by forging sample Nos. 1 to 7 were further hot-worked at 1,000° C. to a thickness of 2 mm and were then cold-worked to a thickness of 1 mm.

Figure 2:
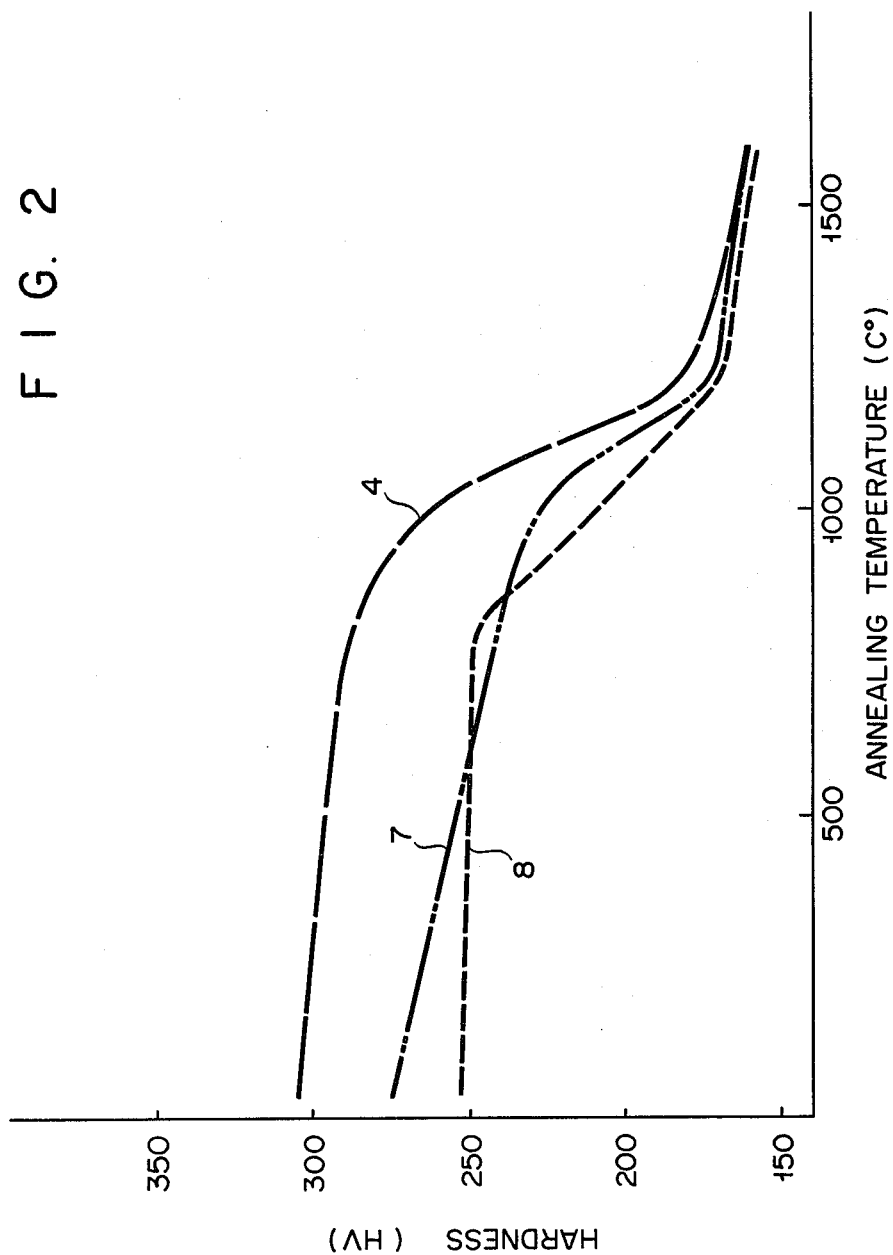

The resultant plates were annealed at different temperatures and changes in hardness were examined. The obtained results are shown in the graphs of FIGS. 1 and 2. FIGS. 1 and 2 show the results obtained with samples which contained the same amount of vanadium. A sample of pure molybdenum was also tested for the purpose of comparison. As may be seen from FIGS. 1 and 2, the molybdenum-based alloys containing boron according to the present invention have higher hardnesses than alloys which did not contain boron. In addition to this, the molybdenum-based alloys of the present invention presented only small decreases in hardness after annealing at high temperatures.

Figure 3:
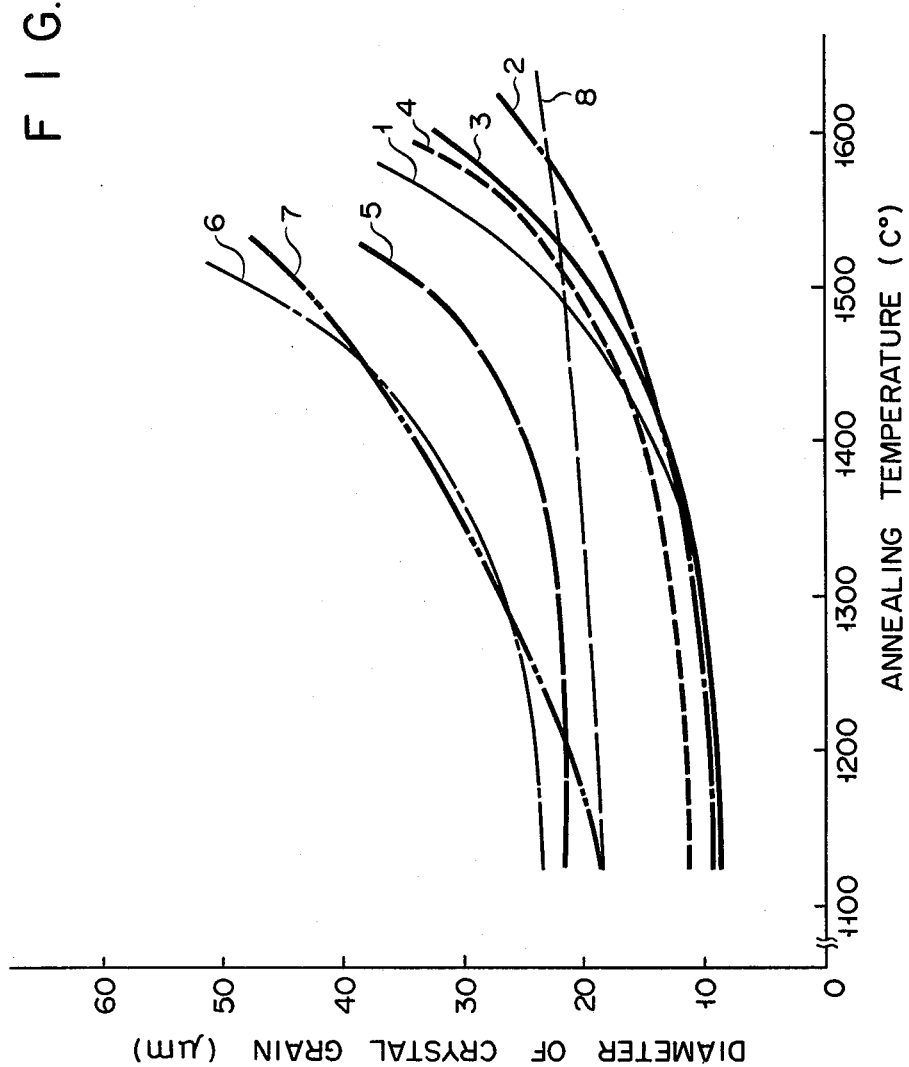
FIG. 3 is a graph showing the grain sizes of the molybdenum-based alloys after annealing.

FIG. 3 shows a graph representing the mean grain sizes of the molybdenum-based alloys after annealing. As may be seen from FIG. 3, the grains do not become coarse and excellent mechanical strength is obtained after recrystallization with the alloys of the present invention. Thus, tensile strength and ductility are improved.

Sample Nos. 1, 3 to 7 shown in Table 1 above were subjected to a tensile strength test at high temperatures under the conditions below:

(Test Conditions)

Test Temperature: 800° C.; 1,000° C.; 1,200° C.; and 1,400° C. (samples were heated to and kept at these temperatures for ten minutes)

Vacuum: $4 \times 10^{-4}$ Torr

Rate of Pulling: 2.5 mm/min. (Rate of Straining $\epsilon'$: $1.4 \times 10^{-3}$/sec.)

The obtained results are shown in FIG. 4.

As may be seen from the results obtained, the addition of boron significantly improves the tensile strength of the alloys at high temperatures.

The molybdenum-based alloy of the present invention has further been found to be improved in the prevention of embrittlement upon irradiation with neutrons. Therefore, the molybdenum-based alloys of the present invention are expected to be applicable to heat-resistant structural materials for high-temperature nuclear furnaces, nuclear fusion furnaces, and so on.

What we claim is:

1. A molybdenum-based alloy resistant to embrittlement upon irradiation with neutrons and consisting of 0.1 to 2.5% by weight of vanadium, 10 to 100 ppm of boron, 10 to 1,000 ppm of carbon, and the balance of molybdenum.

2. A molybdenum-based alloy according to claim 1, wherein boron is contained in an amount of 20 to 80 ppm.

3. A molybdenum-based alloy according to claim 1, wherein carbon is contained in an amount of not greater than 500 ppm.

* * * * *